United States Patent
Goto

(10) Patent No.: US 9,497,788 B2
(45) Date of Patent: Nov. 15, 2016

(54) COMMUNICATION DEVICE, AND CONTROL METHOD THEREFOR

(71) Applicant: CANON KABUSHIKI KAISHA, Tokyo (JP)

(72) Inventor: Fumihide Goto, Naka-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/594,255

(22) Filed: Jan. 12, 2015

(65) Prior Publication Data

US 2015/0124761 A1 May 7, 2015

Related U.S. Application Data

(63) Continuation of application No. 13/124,203, filed as application No. PCT/JP2009/005470 on Oct. 20, 2009, now Pat. No. 8,949,386.

(30) Foreign Application Priority Data

Oct. 22, 2008 (JP) .................................. 2008-272134

(51) Int. Cl.
  *H04W 76/02* (2009.01)
  *H04W 48/16* (2009.01)
  *H04W 84/12* (2009.01)
  *H04W 84/20* (2009.01)

(52) U.S. Cl.
  CPC ........... *H04W 76/021* (2013.01); *H04W 48/16* (2013.01); *H04W 84/12* (2013.01); *H04W 84/20* (2013.01)

(58) Field of Classification Search
  None
  See application file for complete search history.

(56) References Cited

U.S. PATENT DOCUMENTS 6,014,406 A * 1/2000 Shida .................. H04B 1/7156
  370/221
8,625,445 B2 1/2014 Sakai
8,891,771 B2 11/2014 Sakai et al.
(Continued)

FOREIGN PATENT DOCUMENTS

EP          1487155 A2 * 12/2004 ........ H04W 56/0015
JP       2006-309458 A     11/2006
(Continued)

OTHER PUBLICATIONS

Wi-Fi Certified™ for Wi-Fi Protected Setup: Easing the User Experience for Home and Small Office Wi-FiO Networks, pp. 1-14, 2007.

*Primary Examiner* — Andrew Lai
*Assistant Examiner* — Jamaal Henson
(74) *Attorney, Agent, or Firm* — Carter, DeLuca, Farrell & Schmidt, LLP

(57) ABSTRACT

When a communication device detects another communication device operating as a providing device that provides a communication parameter and when a communication parameter has already been set between the communication device and a different communication device or when the communication device is participating in the same network as that in which the different communication device is present, the communication device transmits a session overlap notice to the detected communication device.

9 Claims, 9 Drawing Sheets

(56) References Cited

U.S. PATENT DOCUMENTS

| | | | |
|---|---|---|---|
| 2005/0033816 A1* | 2/2005 | Yamaguchi | H04W 84/20 709/208 |
| 2005/0075084 A1* | 4/2005 | Salokannel | H04L 45/00 455/126 |
| 2006/0094456 A1* | 5/2006 | Rittle | H04W 48/16 455/519 |
| 2006/0221856 A1* | 10/2006 | Quiroz | H04W 84/20 370/254 |
| 2008/0089300 A1 | 4/2008 | Yee | |
| 2008/0267147 A1* | 10/2008 | Niranjan | H04W 8/005 370/338 |
| 2011/0038443 A1 | 2/2011 | Sakai | |
| 2011/0082932 A1 | 4/2011 | Goto | |
| 2011/0170686 A1 | 7/2011 | Goto | |
| 2011/0189958 A1 | 8/2011 | Goto et al. | |
| 2011/0191473 A1 | 8/2011 | Sakai et al. | |
| 2011/0206029 A1 | 8/2011 | Fujii | |
| 2011/0238848 A1 | 9/2011 | Tachibana | |

FOREIGN PATENT DOCUMENTS

| | | |
|---|---|---|
| JP | 2006-311139 A | 11/2006 |
| JP | 2007-251637 A | 9/2007 |
| JP | 2008-187348 A | 8/2008 |

\* cited by examiner

COMMUNICATION DEVICE, AND CONTROL METHOD THEREFOR

CROSS REFERENCE TO RELATED APPLICATIONS

This application is a continuation of U.S. patent application Ser. No. 13/124,203, filed Apr. 14, 2011, which is a national stage application of International Patent Application No. PCT/JP2009/005470 filed Oct. 20, 2009, which claims the benefit of and priority to Japanese Patent Application No. 2008-272134, filed Oct. 22, 2008, the entire contents of each of which are hereby incorporated by reference herein in their entirety.

TECHNICAL FIELD

The present invention relates to a communication device and a control method therefor.

BACKGROUND ART

In wireless communication such as wireless local area network (LAN) communication compatible with the Institute of Electrical and Electronics Engineers (IEEE) 802.11 standard series, a large number of setting items are set before use.

Examples of the setting items include communication parameters necessary for wireless communication, such as a service set identifier (SSID) serving as a network identifier, an encryption method, an encryption key, an authentication method, and an authentication key. It is time-consuming for a user to set all the parameters by manual input.

Accordingly, various vendors have developed automatic setting methods for easily setting communication parameters in wireless devices. In the automatic setting methods, communication parameters are provided from one device to another device using a procedure determined in advance between connected devices via messages so that the communication parameters can be automatically set.

NPL 1 discloses Wi-Fi Protected Setup (hereinafter referred to as "WPS"), which is an industry standard protocol for automatic setting of communication parameters between an access point (base station) and a station (terminal station).

In WPS, since the roles of communication parameter providing device (hereinafter referred to as "providing device") and communication parameter receiving device (hereinafter referred to as "receiving device") are defined in advance, the transfer direction of communication parameters is uniquely determined.

In a case where the roles of providing device and receiving device are not defined in advance, however, it is difficult to uniquely determine the transfer direction of communication parameters. In this case, the user's selection of which device acts as a providing device and which device acts as a receiving device may cause a problem of poor usability.

For example, it is assumed that a new device joins a network that has already been established between a plurality of devices. In this case, it is desirable that the new joining device act as a receiving device and receive communication parameters of the established network. However, since the roles of providing device and receiving device are not defined, the new joining device may become a providing device. In this case, other communication parameters are provided from the device newly participating in the network to the participant devices of the network to prevent the devices from performing communication over the network they are participating in.

CITATION LIST

Non Patent Literature

[NPL 1] Wi-Fi CERTIFIED™ for Wi-Fi Protected Setup: Easing the User Experience for Home and Small Office Wi-Fi® Networks, http://www.wi-fi.org/wp/wifi-protected-setup

SUMMARY OF INVENTION

Other advantages and features of the present invention will become apparent from the following description taken in conjunction with the drawings.

The present invention provides a communication device configured to perform a communication parameter setting process as a providing device configured to provide a communication parameter or a receiving device configured to receive the communication parameter provided by the providing device. The communication device includes a search unit configured to search for another communication device and a setting unit configured to set, in a case where the search unit searches for the another communication device, a role of the communication device to the providing device or the receiving device based on first information included in a signal transmitted from the searched-for another communication device and second information stored in the communication device. In a case where the communication device receives third information different from the first information and transmitted from a device operating as a providing device, the communication device is configured to operate as the receiving device regardless of the second information when the communication device performs the communication parameter setting process with the device.

The present invention further provides a method of controlling a communication device configured to perform a communication parameter setting process as a providing device configured to provide a communication parameter or a receiving device configured to receive the communication parameter provided by the providing device. The method includes searching for another communication device and setting, in a case where the another communication device is searched for, a role of the communication device to the providing device or the receiving device based on first information included in a signal transmitted from the searched-for another communication device and second information stored in the communication device. In a case where the communication device receives third information different from the first information and transmitted from a device operating as a providing device, the communication device is configured to operate as the receiving device regardless of the second information when the communication device performs the communication parameter setting process with the device.

The present invention further provides a non-transitory computer-readable medium storing a program for causing a computer to function as a communication device configured to perform a communication parameter setting process as a providing device configured to provide a communication parameter or a receiving device configured to receive the communication parameter provided by the providing device. The communication device includes a search unit configured to search for another communication device and a setting unit configured to set, in a case where the search unit searches for the another communication device, a role of the communication device to the providing device or the receiving device based on first information included in a signal transmitted from the searched-for another communication device and second information stored in the communication device. In a case where the communication device receives third information different from the first information and transmitted from a device operating as a providing device, the communication device is configured to operate as the receiving device regardless of the second information when the communication device performs the communication parameter setting process with the device.

DETAILED DESCRIPTION

First Embodiment

A communication device according to a first embodiment of the present invention will now be described in detail with reference to the drawings. In the following, a description will be given of a wireless LAN system compatible with the IEEE 802.11 series, by way of example. However, communication other than IEEE 802.11 compatible wireless LAN communication may be used.

A hardware configuration which is available in the present embodiment will now be described.

Figure 1:
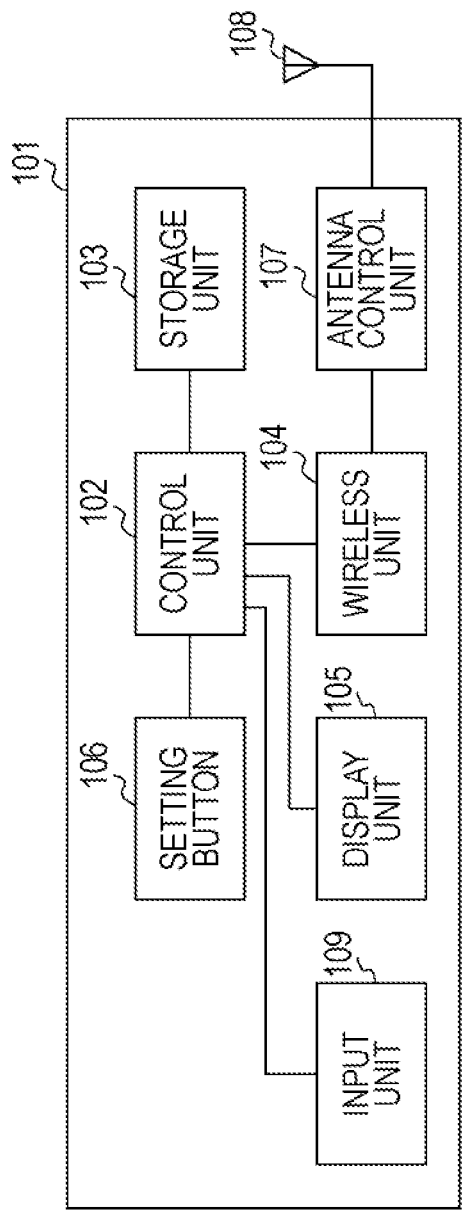
FIG. 1 is a block diagram of a device.

FIG. 1 is a block diagram showing an example configuration of each device described below according to an embodiment of the present invention. A device 101 includes a control unit 102 configured to control the overall operation of the device 101 by executing a control program stored in a storage unit 103. The control unit 102 is also configured to control communication parameter setting with respect to another device. The storage unit 103 is configured to store the control program executed by the control unit 102 and various information such as communication parameters. The control unit 102 executes the control program stored in the storage unit 103 to perform various operations described below.

A wireless unit 104 is configured to perform wireless LAN communication compatible with the IEEE 802.11 series. A display unit 105 is configured to perform various display operations, and has a function capable of outputting visually perceivable information, such as a liquid crystal display (LCD) or light emitting diode (LED) function or capable of outputting sound, such as a speaker function.

A setting button 106 is configured to give a trigger for starting a communication parameter setting process. When the setting button 106 is operated, an automatic setting process of communication parameters is started. Upon detection of a user operation of the setting button 106, the control unit 102 performs the process described below.

An antenna control unit 107 is configured to control an antenna 108. An input unit 109 is configured to allow a user to enter various inputs.

Figure 2:
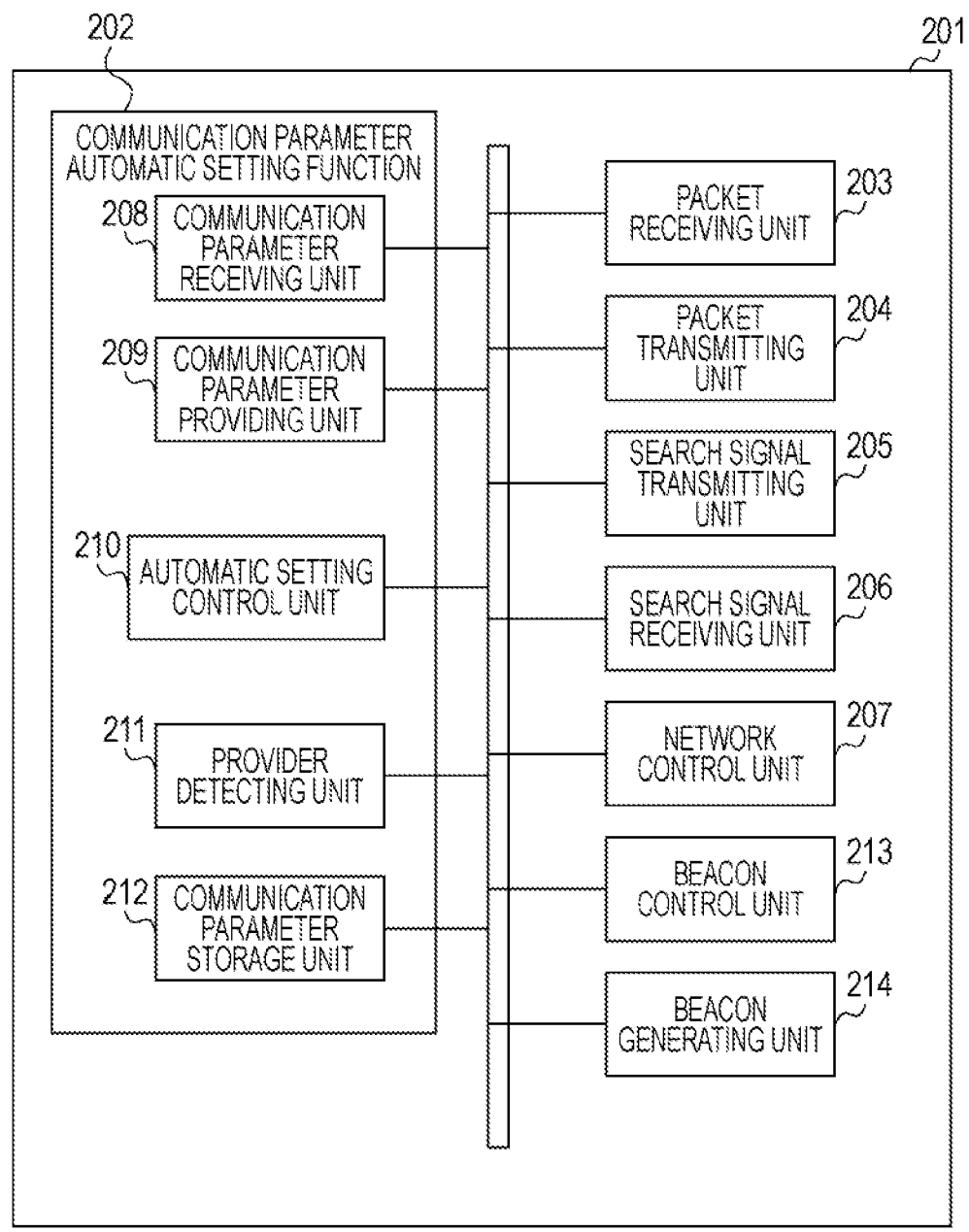
FIG. 2 is a block diagram of software function blocks in the device.

FIG. 2 is a block diagram showing an example configuration of software function blocks for executing an operation for automatically setting communication parameters, which will be described below.

A device 201 includes a communication parameter automatic setting function block 202. In the present embodiment, the communication parameter automatic setting function block 202 is configured to automatically set communication parameters necessary for wireless LAN communication, such as an SSID serving as a network identifier, an encryption method, an encryption key, an authentication method, and an authentication key. The communication parameter automatic setting is hereinafter referred to simply as "automatic setting".

A packet receiving unit 203 is configured to receive packets involved in various types of communication. A beacon (notification signal) is received by the packet receiving unit 203. A packet transmitting unit 204 is configured to transmit packets involved in various types of communication. A beacon is transmitted by the packet transmitting unit 204. Each beacon contains various types of information about a transmitting device thereof.

A search signal transmitting unit 205 is configured to control the transmission of a device search signal such as a probe request. The probe request can also be called a network search signal for searching for a desired network. A probe request is transmitted by the search signal transmitting unit 205. A probe response which is a response signal to a received probe request is also transmitted by the search signal transmitting unit 205. In the present embodiment, when a user operates the setting button 106 and starts the automatic setting process, a beacon, a probe request, and a probe response are transmitted after an information element (IE) indicating automatic setting in progress (the automatic setting operation is ongoing) is added to them.

A search signal receiving unit 206 is configured to control the reception of a device search signal such as a probe request from another device. A probe request is received by the search signal receiving unit 206. A probe response is also received by the search signal receiving unit 206. Each of the device search signal and a response signal thereto contains various types of information about a transmitting device thereof.

A network control unit 207 is configured to control network connection. A connection to a wireless LAN ad-hoc network or the like is implemented by the network control unit 207.

In the automatic setting function block 202, a communication parameter receiving unit 208 is configured to receive (accept) communication parameters from a partner device, and a communication parameter providing unit 209 is configured to provide communication parameters to a partner device. An automatic setting control unit 210 is configured to control various protocols in the automatic setting process. The automatic setting process described below is performed by the communication parameter receiving unit 208 and the communication parameter providing unit 209 under the control of the automatic setting control unit 210.

The automatic setting control unit 210 is further configured to determine whether or not the time elapsed since the start of the automatic setting process exceeds the time limit of the setting process. When it is determined that the elapsed time exceeds the time limit, the automatic setting process is stopped under the control of the automatic setting control unit 210.

A provider detecting unit 211 is configured to detect a communication parameter providing device (hereinafter referred to as a "providing device"). The provider detecting unit 211 detects a providing device on the basis of a search signal transmitted by the search signal transmitting unit 205 and a response thereto received by the search signal receiving unit 206. The provider detecting unit 211 can also detect a providing device on the basis of a beacon received by the packet receiving unit 203. In order to receive communication parameters, the provider detecting unit 211 requests the detected providing device to provide the communication parameters and receives the communication parameters. A device that is provided with communication parameters is hereinafter referred to as a "receiving device".

A communication parameter storage unit 212 is configured to store communication parameters provided from a providing device or communication parameters provided to a receiving device. The communication parameter storage unit 212 may correspond to the storage unit 103. In the present embodiment, when communication parameters are provided from another device, the communication parameters are stored as already set parameters in the storage unit 103. Further, when communication parameters are provided to another device, the communication parameters are stored as already set parameters in the storage unit 212. The already set parameters stored in the storage unit 103 may be discarded at the end of the communication over the network established using the already set parameters. The already set parameters may also be discarded, after a certain period of time has elapsed since the parameters were stored in the storage unit 103, when the power of the device is turned off or at any other event.

A beacon control unit 213 is configured to control the transmission timing of a beacon (notification signal). A beacon generating unit 214 is configured to generate a beacon. The generated beacon is transmitted to the network using the packet transmitting unit 204.

Note that all the function blocks have software or hardware correlation. Furthermore, the function blocks described above are merely examples, and a plurality of function blocks may constitute a single function block or some function blocks may be further divided into a plurality of sub-blocks implementing functions.

Figure 3:
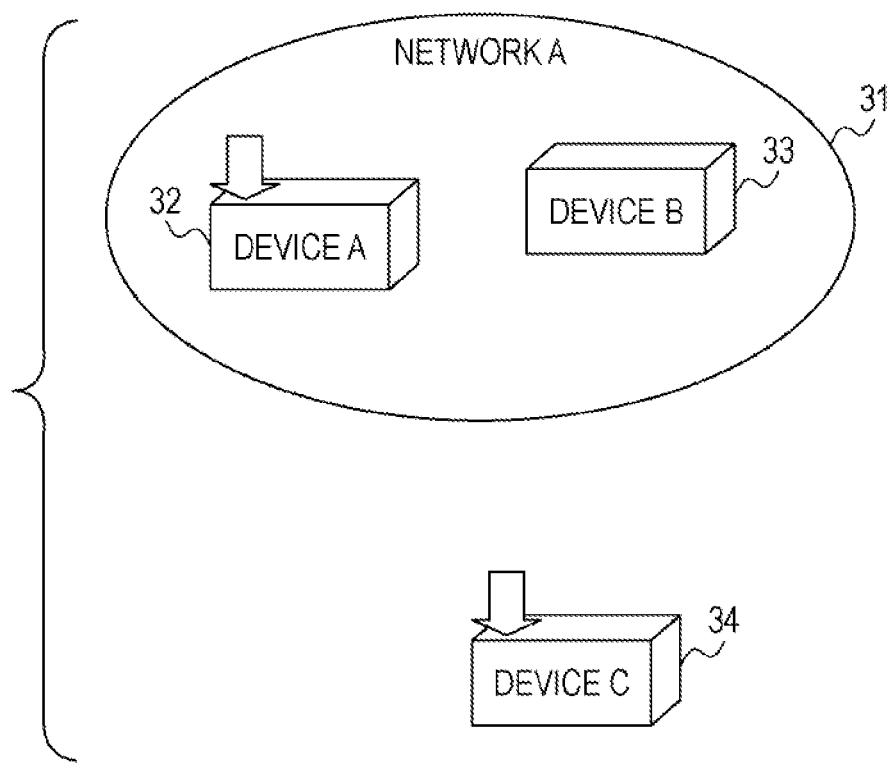
FIG. 3 is a network configuration diagram according to an embodiment of the present invention.

FIG. 3 is a diagram showing a communication device A 32 (hereinafter referred to as a "device A"), a communication device B 33 (hereinafter referred to as a "device B"), a communication device C 34 (hereinafter referred to as a "device C"), and an ad-hoc network A 31 (hereinafter referred to as a "network A"). All the above devices have the configurations described above with reference to FIGS. 1 and 2.

It is assumed that the devices A and B have already performed the automatic setting process therebetween and have established the network A using communication parameters A that are shared between the devices A and B. In the automatic setting process performed between the devices A and B, the device A has acted as a providing device and the device B has acted as a receiving device.

In the present embodiment, in order to allow the device C to participate in the network A, the automatic setting process is performed between the device A participating in the network A and the device C, by way of example.

Here, if the device A acts as a providing device and the device C acts as a receiving device, then the communication parameters A of the network A can be provided from the device A to the device C. This enables the device C to participate in the network A so that the device C can perform data communication with the devices A and B.

Figure 4:
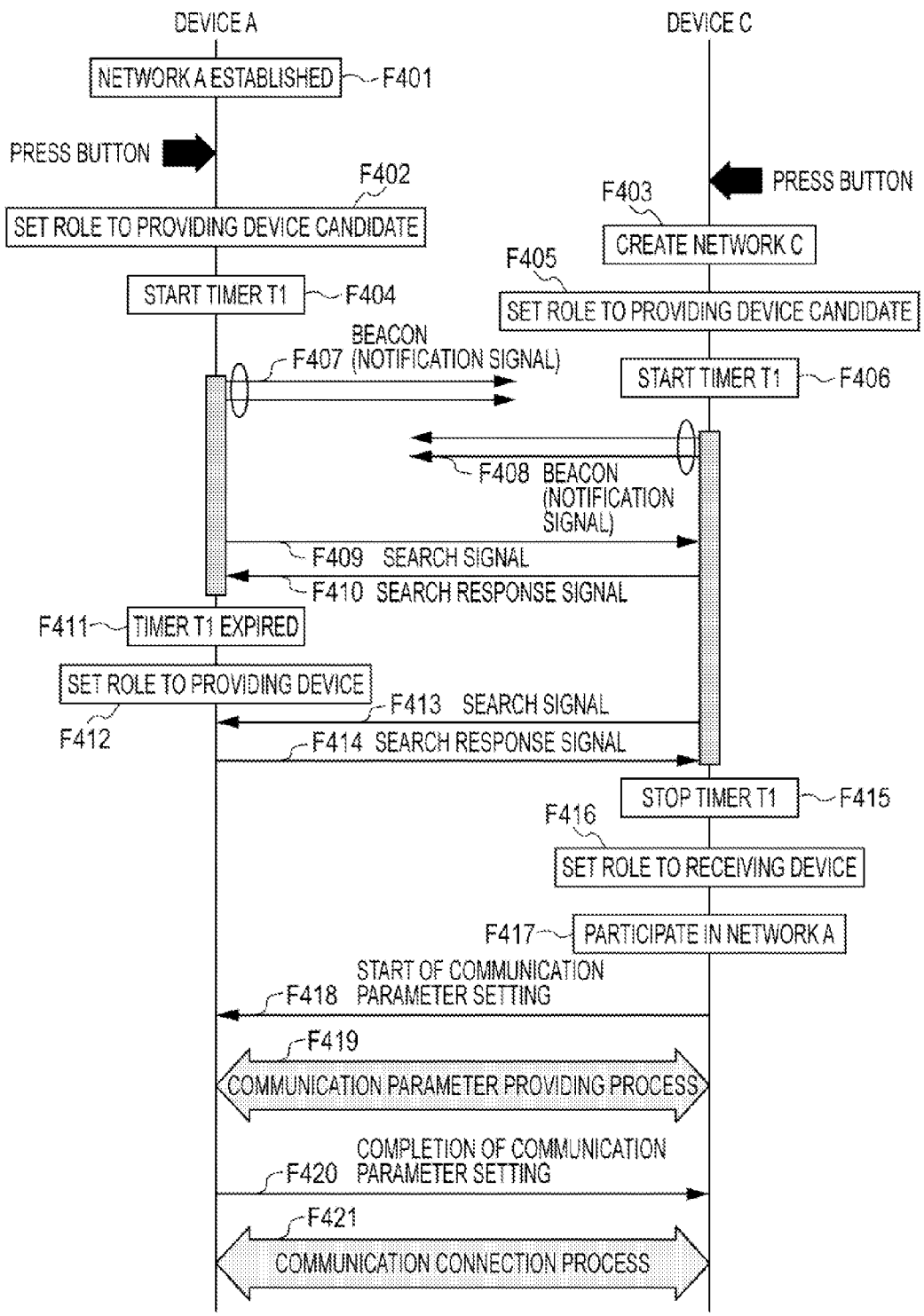
FIG. 4 is a diagram showing a first example of a sequence between devices according to a first embodiment of the present invention.

FIG. 4 is a diagram showing an example of a process sequence performed when the automatic setting process is performed between the devices A and C by pressing the setting buttons 106 of the devices A and C.

The device A has already established the network A with the device B using the communication parameters A that are set in the automatic setting process performed between the devices A and B (F401).

When the setting buttons 106 of the devices A and C are pressed, the device C creates a unique network C (F403). Since the device A has already established the network A, the device A creates no new network.

Here, the networks A and C are distinguished from each other using basic service set identifiers (BSSIDs) serving as network identifiers. BSSID is a random network identifier generated by a device that creates a network. Note that SSID is a network identifier that can be set in advance in a device or that can be set to a desired value by a user, and is different from BSSID. Further, as can be seen from the foregoing description, BSSID is not a communication parameter provided from a providing device to a receiving device in the automatic setting process.

Next, each of the devices A and C starts a process for determining which operation role (hereinafter referred to as "role") of providing device or receiving device the device plays. First, each of the devices A and C sets the role it plays to a providing device candidate (F402, F405), and starts a timer T1 for measuring the time limit of the providing device search process (F404, F406). The term "providing device candidate", as used herein, refers to the device state where the given device has not been set to either a providing device or a receiving device although the device can operate as a providing device.

Next, each of the devices A and C transmits a beacon (notification signal) including an information element indicating that the device has an automatic setting function or is currently performing the automatic setting process (F407, F408). Each beacon may include an information element indicating the current role, "providing device candidate".

Since the beacons contain different BSSIDs for the networks A and C, a device that has received each of the beacons can recognize which network the device that has transmitted the beacon belongs to.

Next, the device A transmits a search signal for searching for a providing device (F409). Like the beacons, the search signal also contains an information element indicating that the transmitter of the search signal has an automatic setting function or is currently performing the automatic setting process or an information element indicating the current role, "providing device candidate".

Upon receipt of the search signal transmitted from the device A, the device C transmits a search response signal to the device A (F410). Like the beacons and the search signal, the search response signal also contains an information element indicating that the transmitter of the search response signal has an automatic setting function or is currently performing the automatic setting process or an information element indicating the current role, "providing device candidate".

If the timer T1 of the device A has expired without a providing device being detected (F411), the device A sets the role it plays to a providing device (F412).

Now, the device C transmits a search signal for searching for a providing device (F413). The search signal transmitted from the device C also contains an information element indicating that the device C has an automatic setting function or is currently performing the automatic setting process or an information element indicating the current role, "providing device candidate".

Upon receipt of the search signal transmitted from the device C, the device A transmits a search response signal to the device C (F414). Like the beacons and the search signal, the search response signal contains an information element indicating that the transmitter of the search response signal has an automatic setting function or is currently performing the automatic setting process. Since the device A has set the role it plays to a providing device at this time, the device A includes an information element indicating a "providing device" in the search response signal and transmits the search response signal. In addition to the information element indicating the role of "providing device", an information element indicating that the device A can provide communication parameters may also be contained.

Upon receipt of the search response signal transmitted from the device A, the device C confirms that the device A plays the role of providing device and can provide communication parameters. Then, the device C stops the timer T1 (F415), sets the role it plays to a receiving device (F416), and participates in the network A (F417).

This allows the devices A and C to transmit and receive communication messages (protocol messages) to be exchanged in the automatic setting protocol process of communication parameters. Since the communication parameters such as an encryption key and an authentication key have not been set in the device C when the device C participates in the network A in F417, the device C is not allowed to perform normal data communication based on encryption and authentication with the device A.

The term "automatic setting protocol process", as used herein, refers to a process for transmitting and receiving various predetermined communication messages in order to provide communication parameters from a providing device to a receiving device. In WPS, this protocol process is called Registration Protocol (see NPL 1). In the present embodiment, for ease of description, the following procedures 1 to 3 will be described as the automatic setting protocol process:

1. A message indicating the start of communication parameter setting (message for requesting the provision of communication parameters) is transmitted from a receiving device to a providing device.

2. In response to the message, the providing device performs a process of providing communication parameters to the receiving device.

3. When the provision of the communication parameters is completed, a message indicating the completion of communication parameter setting is transmitted from the providing device to the receiving device.

While in the foregoing description, a providing device is searched for by performing active scan using a search signal and a search response signal, passive scan for searching for a providing device by waiting for a beacon to be received may be used. Alternatively, a providing device may be searched for using a combination of active scan and passive scan.

When the device C participates in the network A, the device C transmits a message indicating the start of communication parameter setting to the device A (F418). Then, in response to the message, a providing process for providing the communication parameters A from the device A to the device C is performed (F419). When the providing process is completed, the device A transmits a message indicating the completion of communication parameter setting to the device C (F420). Accordingly, the communication parameter setting process is completed, and the communication parameters A are shared between the devices A and C.

Then, the devices A and C perform a communication connection process using the shared communication parameters A (F421). The communication connection process may be automatically started when the communication parameter setting process is completed, thereby facilitating communication between the devices A and C without causing a user to perform an operation.

In this manner, when the device A becomes a providing device according to the role setting sequence, the communication parameters A are provided to the device C. However, depending on the pressing timing of the setting buttons 106 of the devices A and C, the device C may become a providing device and the device A may become a receiving device. In this case, communication parameters C, which are different from the communication parameters A, are provided from the device C to the device A. This enables the devices A and C to establish a new network using the communication parameters C but prevents the devices A and C from communicating with the device B over the network A. In the present embodiment, therefore, a process for avoiding the occurrence of such a situation will be described.

Figure 5:
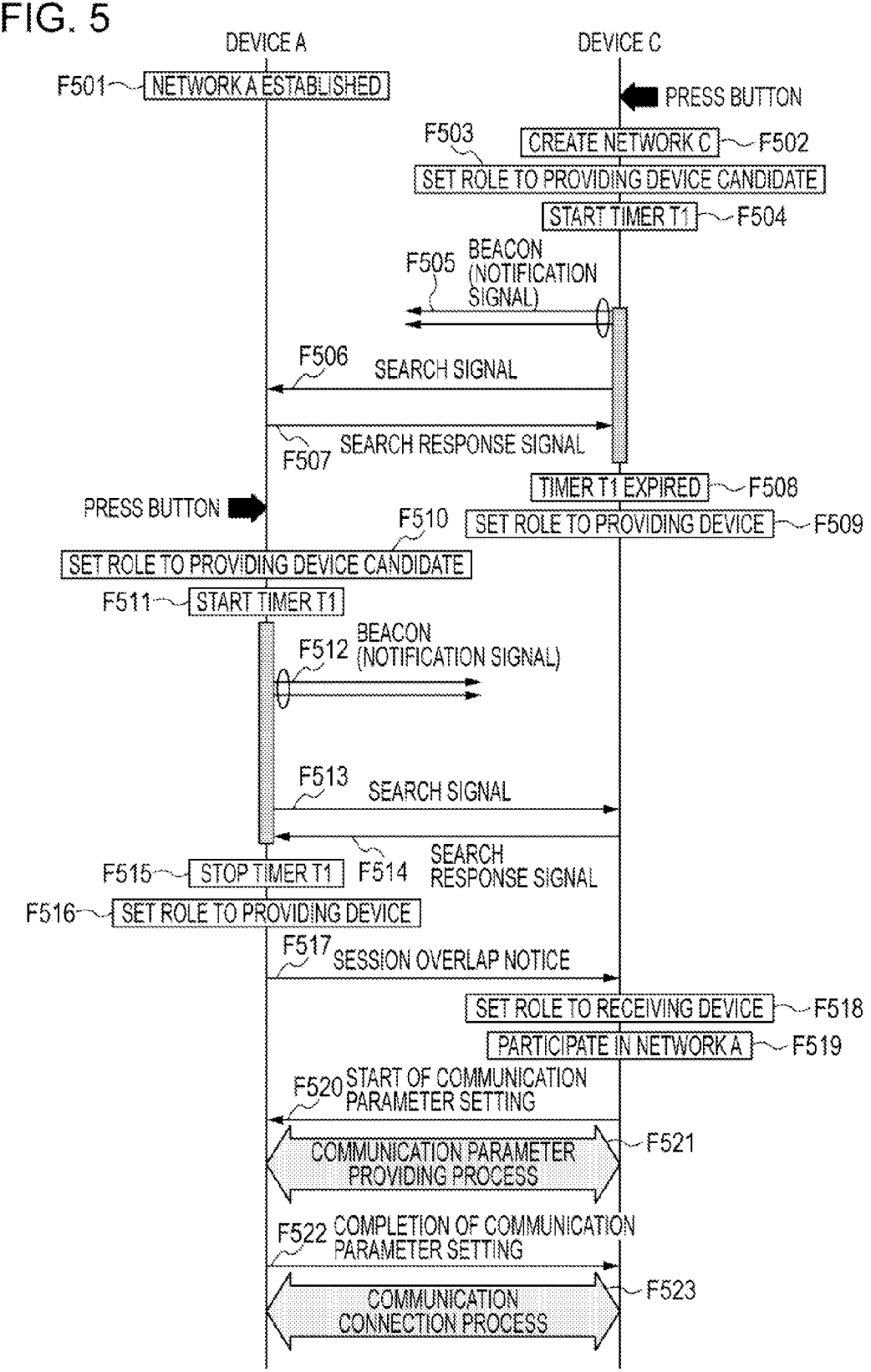
FIG. 5 is a diagram showing a second example of a sequence between devices according to the first embodiment.

FIG. 5 is a diagram showing an example of a process sequence performed when the automatic setting process is performed between the devices A and C by pressing the setting buttons 106 of the devices A and C.

The device A has already established the network A with the device B using the communication parameters A that are set in the automatic setting process performed between the devices A and B (F501).

When the setting button 106 of the device C is pressed here, the device C creates a unique network C (F502).

Then, the device C starts a process for determining which of a providing device and a receiving device the device C acts as. First, the device C sets itself to the providing device candidate (F503), and starts a timer T1 for measuring the time limit of the providing device search process (F504).

Then, the device C transmits a beacon (notification signal) including an information element indicating that the device C has an automatic setting function or is currently performing the automatic setting process (F505). The beacon may include an information element indicating the current role, "providing device candidate".

Subsequently, the device C transmits a search signal for searching for a providing device (F506). Like the beacon, the search signal also contains an information element indicating that the device C has an automatic setting function or is currently performing the automatic setting process or an information element indicating the current role, "providing device candidate".

Upon receipt of the search signal transmitted from the device C, the device A transmits a search response signal to the device C (F507). Since the setting button 106 of the device A has not been pressed when the device A receives the search signal, the device A has not started the automatic setting process. Thus, the device A transmits a search response signal including an information element indicating that the device A has an automatic setting function but is not currently performing the automatic setting process.

If the timer T1 of the device C has expired without a providing device being detected (F508), the device C sets the role it plays to a providing device (F509).

When the setting button 106 of the device A is pressed here, the device A sets itself to the providing device candidate (F510), and starts a timer T1 for measuring the time limit of the providing device search process (F511).

Next, the device A transmits a beacon (notification signal) including an information element indicating that the device A has an automatic setting function or is currently performing the automatic setting process (F512). The beacon may include an information element indicating the current role, "providing device candidate".

Subsequently, the device A transmits a search signal for searching for a providing device (F513). Like the beacon, the search signal also contains an information element indicating that the device A has an automatic setting function or is currently performing the automatic setting process or an information element indicating the current role, "providing device candidate".

Upon receipt of the search signal transmitted from the device A, the device C transmits a search response signal to the device A (F514). Like the beacon and the search signal, the search response signal also contains an information element indicating that the transmitter of the search response signal has an automatic setting function or is currently performing the automatic setting process. Since the device C has set the role it plays to a providing device at this time, the device C includes an information element indicating a "providing device" in the search response signal and transmits the search response signal. In addition to the information element indicating the role of "providing device", an information element indicating that the device C can provide communication parameters may also be contained.

Upon receipt of the search response signal transmitted from the device C, the device A confirms that the device C plays the role of providing device and can provide communication parameters. Thus, the device A stops the timer T1 (F515).

If the device A sets the role it plays to a receiving device here, communication parameters C, which are different from the communication parameters A, are provided from the device C to the device A. Thus, in order to maintain the network A, the device A sets the role it plays to a providing device rather than a receiving device (F516).

Therefore, both the devices C and A become providing devices. Thus, the device A transmits a session overlap notice to the device C to notify that a plurality of providing devices are present (F517).

Upon receipt of the session overlap notice from the device A, the device C determines that the device C can no longer continue acting as a providing device, and changes the role it plays to a receiving device (F518). Then, the device C is provided with communication parameters from the device A, and performs a communication connection process using the communication parameters shared between the devices A and C (F519 to F523). The processing of F519 to F523 is similar to the processing of F417 to F421 shown in FIG. 4, and will not be described herein.

Figure 6:
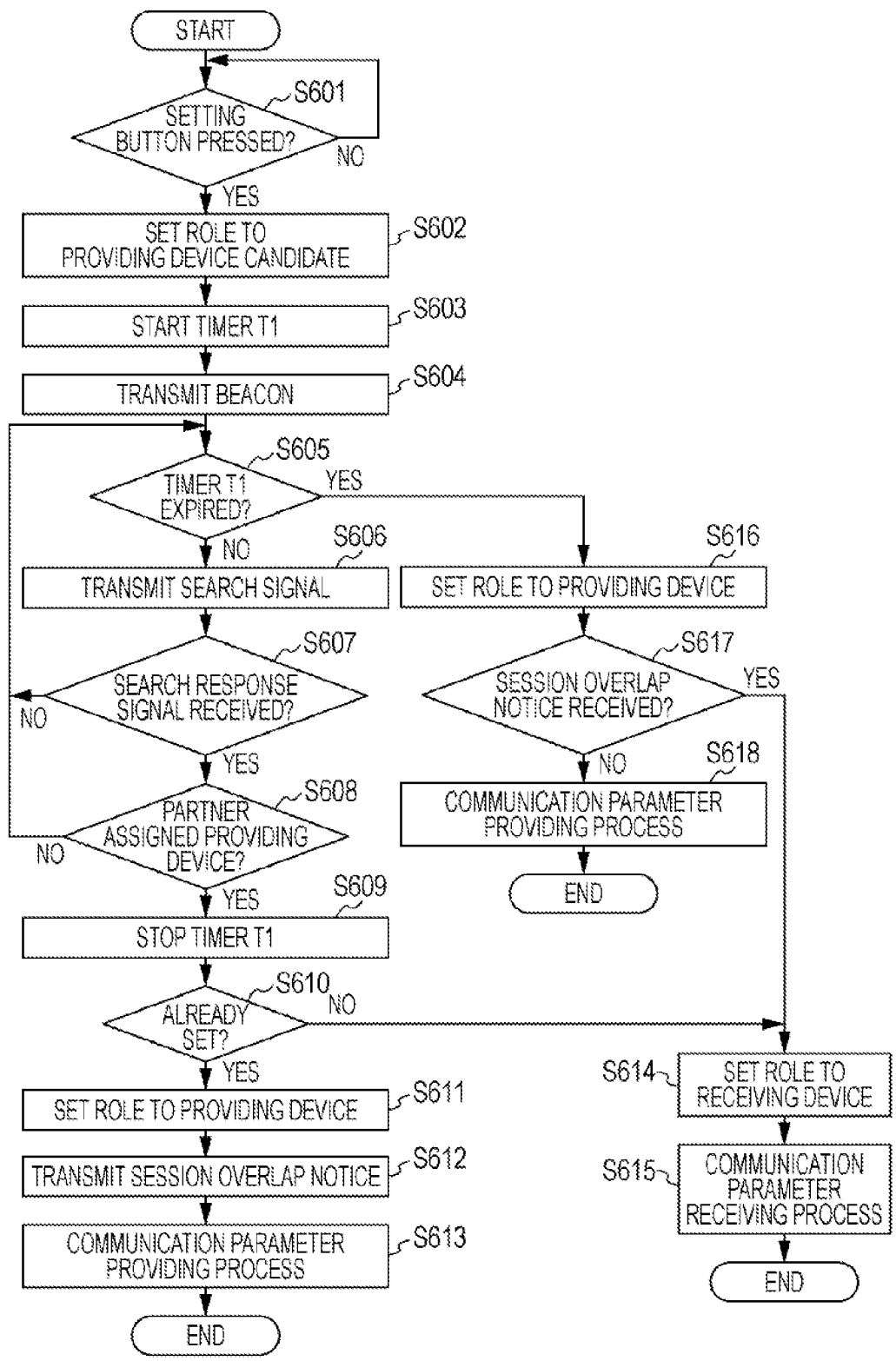
FIG. 6 is a flowchart showing a role setting process for a communication device according to the first embodiment.

FIG. 6 is a flowchart showing an example of the operation flow performed between the devices A and C.

The control executed by both devices will now be described along the flowchart.

First, a device determines whether or not the setting button 106 thereof has been pressed for instructing start of the automatic setting process (S601). When it is determined in S601 that the setting button 106 has been pressed, the device sets the role it plays to the providing device candidate (S602), and starts a timer T1 (S603).

Then, after setting the role to the providing device candidate, the device starts the transmission of a beacon including an information element indicating that the device has an automatic setting function or is currently performing the automatic setting process (S604). The beacon may include an information element indicating the current role, "providing device candidate".

Then, the device performs a providing device search process until a providing device has been found or the timer T1 has expired (S605 to S608). Specifically, if the timer T1 has not expired in S605, the device transmits a search signal (probe request) (S606), and waits for a search response signal (probe response) to be received (S607).

Upon receipt of a search response signal, the device refers to the information element in the search response signal and determines whether or not the partner device plays the role of providing device (S608). If the partner device plays the role of providing device, the device stops the timer T1 (S609).

When no search response signal is received in S607 or when it is determined in S608 that the partner device plays a role other than a providing device on the basis of the information element in the received search response signal, the device returns to S605 and performs the process again.

After the timer T1 is stopped in S609, the device checks whether or not the device has already performed the automatic setting process with another device (S610).

The determination of whether or not the automatic setting process has already been performed may be performed by determining whether or not already set parameters have been stored in the storage unit 103. When the device has already performed the automatic setting process with another device, the device sets the role it plays to a providing device (S611).

Then, the device transmits a session overlap notice to the partner device (S612). After the partner device that has received the session overlap notice is switched to a receiving device, the device performs a process of providing communication parameters to the partner device (S613).

After the session overlap notice has been transmitted, the display unit 105 may perform display to prompt a user to enter an instruction as to whether or not to continue the automatic setting process so as to switch between continuation and termination of the automatic setting process in accordance with the instruction entered by the user. Alternatively, when the session overlap notice is transmitted, the automatic setting process may be terminated due to error.

When it is determined in S610 that the automatic setting process has not yet been performed, the device sets the role it plays to a receiving device (S614). Then, the device performs a process of receiving communication parameters provided from the partner device acting as a providing device (S615).

When the timer T1 has expired in S605 without a providing device being discovered, the device sets the role it plays to a providing device (S616). Then, after the device has set the role it plays to a providing device, upon receipt of a session overlap notice from another device (S617), then in S614, the device switches the role it plays to a receiving device, and is provided with communication parameters from the providing device (the transmitter of the session overlap notice) (S615).

The device may restart the automatic setting process (resume the process from S602) upon receipt of a session overlap notice. In this case, the providing device that is the transmitter of the session overlap notice is detected in the providing device search process (S605 to S608). As a result, the device can act as a receiving device and can be provided with communication parameters from the providing device. Alternatively, upon receipt of a session overlap notice, the device may terminate the automatic setting process due to error.

When no session overlap notice is received, the device performs a process of providing communication parameters to a device that has started the operation as a receiving device (S618).

Accordingly, the present embodiment ensures that a network established using communication parameters set in the previous automatic setting process can be maintained even when a new automatic setting process is started.

In the foregoing description, the device C newly participates in the network A that has been established between the devices A and B, by way of example. In some cases, the device B may be temporarily disconnected from the network A due to some reasons (such as radio interference or unexpected power-off due to the user's operation error). Even in such cases, the present embodiment allows the device A to provide communication parameters A shared with the device B to the device C, and the device B can be returned to the network A using the communication parameters A.

In the foregoing description, furthermore, in order to transmit a session overlap notice to a partner device that has started the operation as a providing device in S612, a device sets the role it plays to a providing device in S611. However, the device may not necessarily set the role it plays to a providing device. When it is determined in S610 that the automatic setting process has already been performed, the device may omit the processing of S611 and may transmit a session overlap notice in S612.

In the foregoing description, furthermore, a device transmits a session overlap notice to a partner device acting as a providing device in order to cause the partner device to stop the operation as a providing device. However, a session overlap notice may not necessarily be used as far as limitations can be imposed on the operation of the partner device acting as a providing device. For example, a message for instructing termination of the automatic setting process or a message for instructing limitation or termination of the operation of the partner device as a providing device may be used.

In the foregoing description, furthermore, the determination of whether or not the automatic setting process has already been performed is performed by determining in S610 as to whether or not already set parameters have been stored in the storage unit 103. However, any other method may be used to perform the determination. For example, a history of the execution of the automatic setting process may be stored in the storage unit 103, and the determination of whether or not the automatic setting process has already been performed may be performed based on the history of the execution. In this case, the time (or date) when the automatic setting process was performed may be stored as a history of execution, and the determination of whether or not the automatic setting process has already been performed may be determined in accordance with the time elapsed since the automatic setting process was performed. In an exemplary method, even if a history of the automatic setting process having been executed previously is stored, when a certain period of time has elapsed (such as an hour later or a day later), it may be determined that the automatic setting process has not yet been performed.

Second Embodiment

In the first embodiment, a device that has started the automatic setting process is first set to the providing device candidate and performs a providing device search process regardless of whether or not the device has already performed the automatic setting process with another device.

In a second embodiment of the present invention, an exemplary process using a role setting algorithm different from that in the first embodiment will be described. In the role setting algorithm described in the second embodiment, a device first determines whether or not the device is participating in a network. When it is determined that the device is participating in the network, the device acts as a providing device without waiting for a timer T1 to expire.

The second embodiment also employs a device configuration and network configuration similar to those in the first embodiment.

Figure 8:
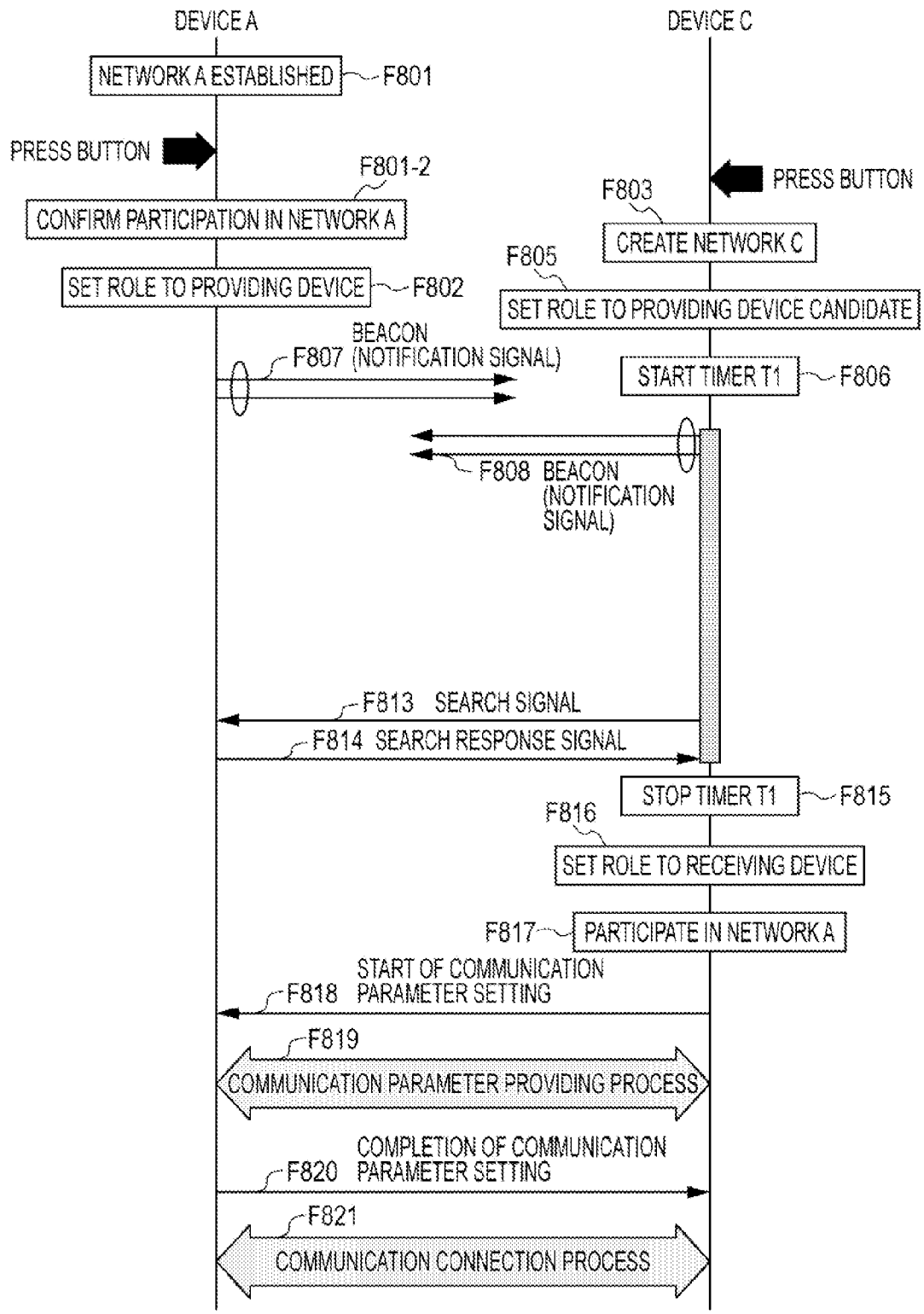
FIG. 8 is a diagram showing a first example of a sequence between devices according to the second embodiment.

FIG. 8 is a diagram showing an example of a process sequence performed when the automatic setting process is performed between the devices A and C by pressing the setting buttons 106 of the devices A and C.

The device A has already established the network A with the device B using the communication parameters A that are set in the automatic setting process performed with the device B (F801).

When the setting button 106 of the device A is pressed, the device A first checks whether or not the device A is participating in a network. The term "participating in a network", as used herein, means that another device that holds the same BSSID as the BSSID held in a given device exists. For example, even when the device A has already performed the automatic setting process and shares communication parameters A with the device B, if the power of the device B is turned off, the device B does not hold the same BSSID. In this case, it is determined that the device A is not participating in the network.

In the network configuration shown in FIG. 3, "the device A is participating in a network" means the devices A and B are present in the same network. Therefore, when the device B is participating in a network created by the device A or when the device A is participating in a network created by the device B, it is determined that "the device A is participating in a network". When the device B is not participating in a network created by the device A or when the devices A and B have created different networks, it is determined that "the device A is not participating in a network". The determination of whether or not a given device is participating in a network can be performed by, for example, performing active scan and/or passive scan and determining whether or not a device having the same BSSID as and a different MAC address from the given device can be discovered.

Furthermore, when, in addition to the discovery of a device having the same BSSID as and a different MAC address from a given device, the given device can perform communication with the discovered device in an upper layer, it may be determined that the given device is "participating in a network". That is, even when a device having the same BSSID as and a different MAC address from a given device is discovered, unless communication in an upper layer can be performed, it is determined that the given device is not "participating in a network". For example, a device may transmit a Ping and may determine whether or not a response thereto can be received to determine whether or not the device is participating in a network.

The device A checks whether or not the device A is participating in the network A, that is, whether or not the device B is present in the network A (F801-2). When the device A confirms the presence of the device B, the device A sets the role it plays to a providing device (F802).

When the setting button 106 of the device C is pressed, the device C creates a unique network C (F803). Then, the device C sets itself to the providing device candidate (F805), and starts a timer T1 (F806).

Next, each of the devices A and C transmits a beacon (notification signal) including an information element indicating that the device has an automatic setting function or is currently performing the automatic setting process (F807, F808). The device C may include an information element indicating the current role, "providing device candidate", in the beacon. The device A may include an information element indicating a "providing device" in the beacon.

Next, the device C transmits a search signal for searching for a providing device (F813). The search signal transmitted from the device C also contains an information element indicating that the device C has an automatic setting function or is currently performing the automatic setting process or an information element indicating the current role, "providing device candidate".

Upon receipt of the search signal transmitted from the device C, the device A transmits a search response signal to the device C (F814). Like the beacons and the search signal, the search response signal contains an information element indicating that the device A has an automatic setting function or is currently performing the automatic setting process. Since the device A has set the role it plays to a providing device at this time, the device A includes an information element indicating a "providing device" in the search response signal and transmits the search response signal. In addition to the information element indicating the role of "providing device", an information element indicating that the device A can provide communication parameters may be contained.

Upon receipt of the search response signal transmitted from the device A, the device C confirms that the device A plays the role of providing device and can provide communication parameters. Thus, the device C stops the timer T1 (F815), sets the role it plays to a receiving device (F816), and participates in the network A (F817). This allows the devices A and C to transmit and receive communication messages to be exchanged in the automatic setting protocol process of communication parameters. Since the communication parameters such as an encryption key and an authentication key have not been set in the device C when the device C participates in the network A in F817, the device C is not allowed to perform normal data communication based on encryption and authentication with the device A.

While in the foregoing description, a providing device is searched for by performing active scan using a search signal and a search response signal, passive scan for searching for a providing device by waiting for a beacon to be received may be used. Alternatively, a providing device may be searched for using a combination of active scan and passive scan.

When the device C participates in the network A, the device C transmits a message indicating the start of communication parameter setting to the device A (F818). Then, in response to the message, a providing process for providing the communication parameters A from the device A to the device C is performed (F819). When the providing process is completed, the device A transmits a message indicating the completion of communication parameter setting to the device C (F820). Accordingly, the communication parameter setting process is completed, and the communication parameters A are shared between the devices A and C.

Then, the devices A and C perform a communication connection process using the shared communication parameters A (F821).

In this manner, when the device A becomes a providing device at the time when it is checked that the device A is participating in a network, the device C is set to a receiving device, and therefore the communication parameters A are provided to the device C. However, even if such control is performed, depending on the pressing timing of the setting buttons 106 of the devices A and C, the device C may become a providing device and the device A may become a receiving device. In the present embodiment, therefore, a process for avoiding the occurrence of such a situation will be described.

Figure 9:
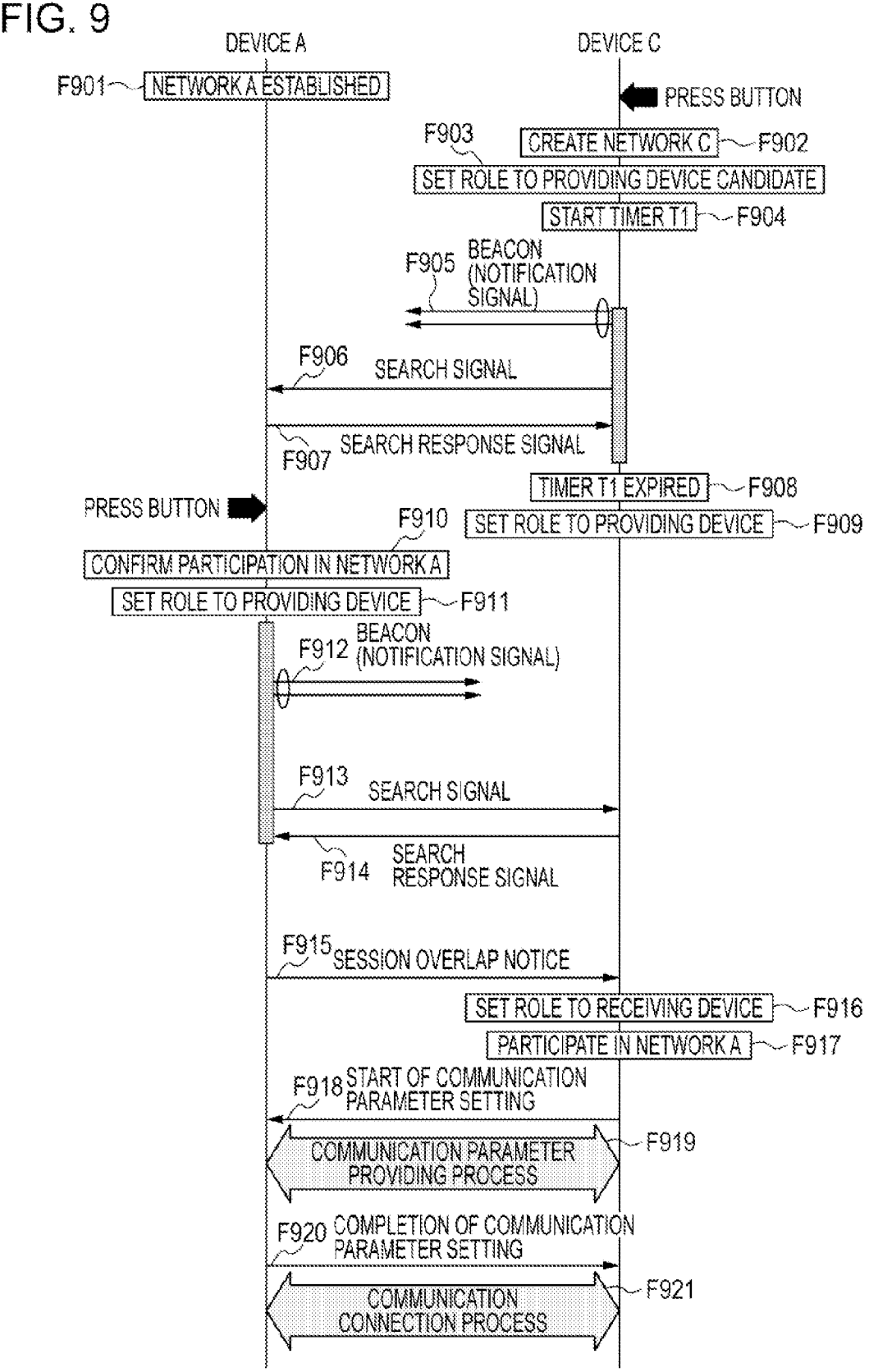
FIG. 9 is a diagram showing a second example of a sequence between devices according to the second embodiment.

FIG. 9 is a diagram showing an example of a process sequence performed when the automatic setting process is performed between the devices A and C by pressing the setting buttons 106 of the devices A and C.

The device A has already established the network A with the device B using the communication parameters A that are set in the automatic setting process performed between the devices A and B (F901).

When the setting button 106 of the device C is pressed here, the device C creates a unique network C (F902).

Then, the device C sets itself to the providing device candidate (F903), and starts a timer T1 (F904)

Next, the device C transmits a beacon (notification signal) including an information element indicating that the device C has an automatic setting function or is currently performing the automatic setting process (F905). The beacon may include an information element indicating the current role, "providing device candidate".

Subsequently, the device C transmits a search signal for searching for a providing device (F906). Like the beacon, the search signal also contains an information element indicating that the device C has a communication parameter automatic setting function or is currently performing the processing or an information element indicating the current role, "providing device candidate".

Upon receipt of the search signal transmitted from the device C, the device A transmits a search response signal to the device C (F907). Since the setting button 106 of the device A has not been pressed when the device A receives the search signal, the device A has not started the automatic setting process. Thus, the device A transmits a search response signal including an information element indicating that the device A has an automatic setting function but is not currently performing the automatic setting process.

If the timer T1 of the device C has expired without a providing device being detected (F908), the device C sets the role it plays to a providing device (F909).

When the setting button 106 of the device A is pressed here, the device A confirms that the device B is participating in the network A where the device A is participating (F910), and thereafter sets the role it plays to a providing device (F911).

When the presence of the device B cannot be confirmed, the device A sets the role it plays to the providing device candidate. In this case, the subsequent operation sequence is the same as or similar to that described in the first embodiment.

Next, the device A transmits a beacon (notification signal) including an information element indicating that the device A has an automatic setting function or is currently performing the automatic setting process (F912). The beacon may include an information element indicating the current role, "providing device".

Subsequently, the device A transmits a search signal to determine whether or not another providing device is present (F913). Like the beacon, the search signal also contains an information element indicating that the device A has an automatic setting function or is currently performing the automatic setting process or an information element indicating the current role, "providing device".

Upon receipt of the search signal transmitted from the device A, the device C transmits a search response signal to the device A (F914). Like the beacon and the search signal, the search response signal also contains an information element indicating that the device C has an automatic setting function or is currently performing the automatic setting process. Since the device C has set the role it plays to a providing device at this time, the device C includes an information element indicating a "providing device" in the search response signal and transmits the search response signal. In addition to the information element indicating the role of "providing device", an information element indicating that the device C can provide communication parameters may be contained.

Upon receipt of the search response signal, the device A can recognize the presence of a providing device in addition to the device A. Thus, the device A transmits a session overlap notice to cause the device C to stop the operation as a providing device (F915).

Upon receipt of the session overlap notice from the device A, the device C determines that the device C can no longer continue acting as a providing device, and changes the role it plays to a receiving device (F916). Then, the device C is provided with communication parameters from the device A, and performs a communication connection process using the communication parameters shared between the devices A and C (F917 to F921). The processing of F917 to F921 is similar to the processing of F817 to F821 shown in FIG. 8, and will not be described herein.

Figure 7:
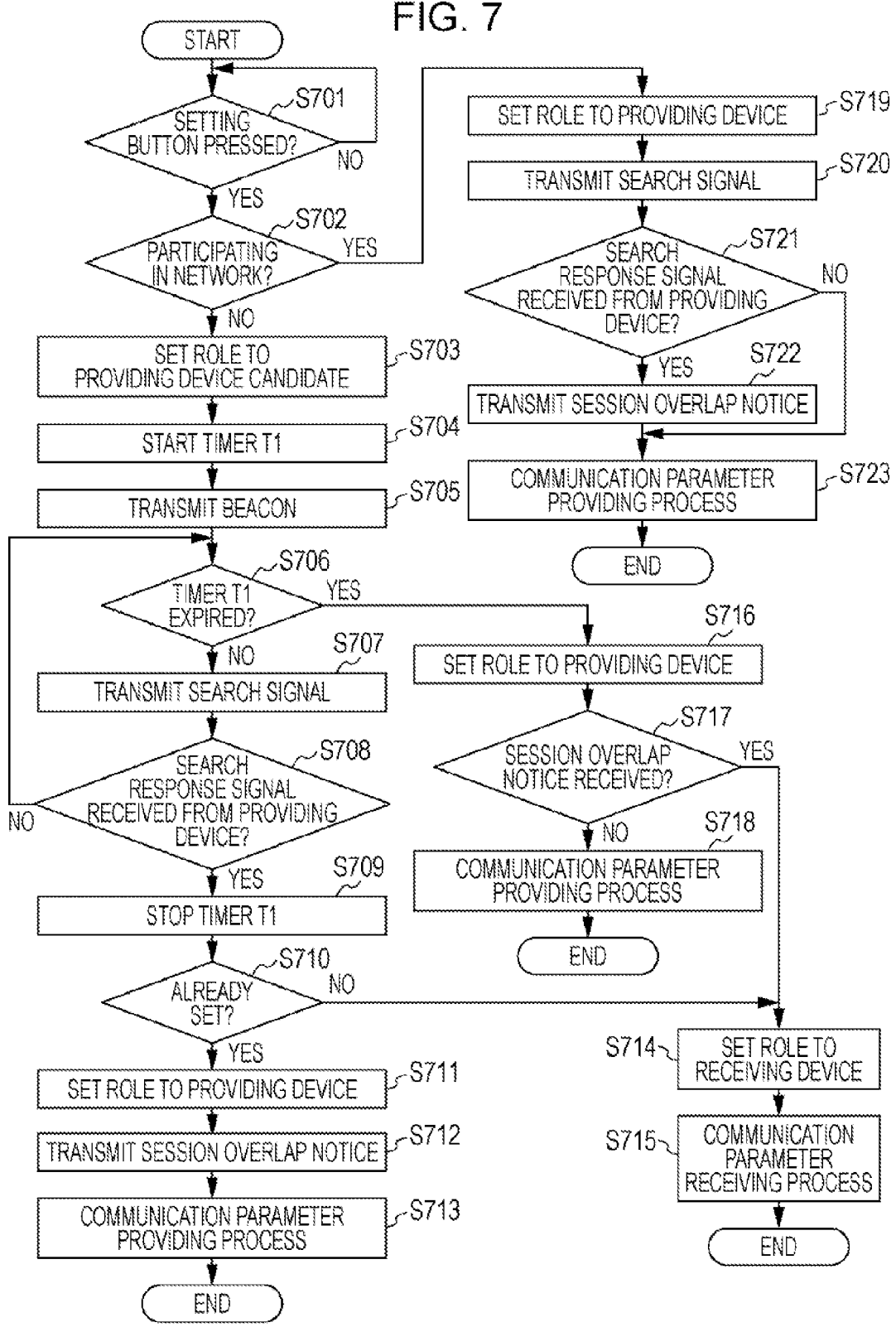
FIG. 7 is a flowchart showing a role setting process for the a communication device according to a second embodiment of the present invention.

FIG. 7 is a flowchart showing an example of the operation flow performed between the devices A and C according to the second embodiment.

The control executed by both devices will now be described along the flowchart.

First, a device determines whether or not the setting button 106 thereof has been pressed for instructing start of the automatic setting process (S701).

When it is determined in S701 that the setting button 106 has been operated, the device checks whether or not the device is now participating in a network (S702).

When it is determined in S702 that the device is participating in a network, the device sets the role it plays to a providing device to allow another new device to participate in the network (S719).

After the device is set as a providing device, the device transmits a search signal (probe request) (S720), and waits for a search response signal (probe response) to be received for a certain period of time (S721). When a search response signal is received from a providing device in S721, there may be a possibility that the communication over the network where the device is participating may not be maintained. Thus, the device transmits a session overlap notice to the other providing device (S722). Then, after the other device that has received the session overlap notice is switched to a receiving device, the device performs a process of providing communication parameters to the other device (S723).

After the session overlap notice has been transmitted, the display unit 105 may perform display to prompt a user to enter an instruction as to whether or not to continue the automatic setting process so as to switch between continuation and termination of the automatic setting process in accordance with the instruction entered by the user. Alternatively, when the session overlap notice is transmitted, the automatic setting process may be terminated due to error.

When a search response signal is not received from a providing device in S721, the device performs a process of providing communication parameters to a partner device that has started the operation as a receiving device (S723).

When it is determined in S702 that the device is not participating in a network, the device continues a process similar to that in the first embodiment (the process after S602 shown in FIG. 6).

Accordingly, the present embodiment can achieve advantages similar to those in the first embodiment even with the use of a role setting algorithm different from that in the first embodiment.

In the foregoing description, when it is determined in S702 shown in FIG. 7 that the device is not participating in a network, the processing after S602 shown in FIG. 6 is performed. However, all the processing may not necessarily be performed in the same manner. Modifications will now be described.

When it is determined in S702 that no other devices are present in the same network, there is less need to maintain the network, and the device may act as a receiving device and receive new communication parameters from another device. Accordingly, when it is determined in S702 that no other devices are present in the same network and when a providing device is detected in S708, the device may set the role it plays to a receiving device regardless of whether or not the device has already performed the automatic setting process with another device. In other words, the determination process of S710 may be omitted and the device may proceed to S714.

In the foregoing description, the network A is established using the communication parameters A that are set in the automatic setting process performed in advance between the devices A and B. However, the present invention can be applied even in a case where a network is established between the devices A and B using communication parameters set by manual input by a user.

In this case, communication parameters set during manual setting (hereinafter as "communication parameters A'") are stored as already set parameters in the storage unit 103. Then, in S702, it is determined whether or not the device is participating in a network established using the communication parameters A'. When it is determined that the device is participating in the network, in S719, the device sets the role it plays to a providing device. In S723, the device provides the communication parameters A' to the partner device. When it is determined that the device is not participating in the network, the processing after S703 is performed. In S710, it is determined whether or not the communication parameters A' have already been manually set. When it is determined that the communication parameters A' have already been manually set, the device sets the role it plays to a providing device (S711), and transmits a session overlap notice to the partner device (S712). Then, in S713, the device provides the communication parameters A' to the partner device. When communication parameters have not yet been manually set, the device sets the role it plays to a receiving device (S714), and receives communication parameters from a partner device acting as a providing device (S715). Therefore, a network can be established by manual setting, and the network can be maintained even when the automatic setting process is performed to allow a new device to participate in the network.

Furthermore, the determination processes of S702 and S710 may be performed in a different manner depending on whether communication parameters have already been set by the automatic setting process or by manual setting. For example, in S702, regardless of which of automatic setting or manual setting has been used to set communication parameters, it may be determined whether or not the device is participating in a network established using the set communication parameters. In S710, it may be determined whether or not the communication parameters have already been set in the automatic setting process. That is, when the communication parameters have already been set by manual setting, in S702, it is determined whether or not the device is participating in the network established using the already set communication parameters. When it is determined that the device is not participating in the network, the device performs the processing after S703. Then, in the determination of S710, since the communication parameters have already been set by manual setting but not by automatic setting, the device proceeds to S714. This enables adaptive switching of the determination of the maintenance of the network by determining which method of automatic setting and manual setting has been used to set the communication parameters. For example, when the communication parameters have already been set by the automatic setting process, other communication parameters can be prevented from being provided from another device. Further, when the communication parameters have already been set by manual setting, if another device is present in the network established using the already set communication parameters, the network can be maintained. If no other devices are present, on the other hand, the device can be ready to receive new communication parameters from another different device.

Furthermore, like the first embodiment, the device sets the role it plays to a providing device in S711 in order to transmit a session overlap notice in S712. However, the device may not necessarily set the role it plays to a providing device. When it is determined in S710 that communication parameters have already been set, the device may omit the processing of S711 and may transmit a session overlap notice in S712.

Furthermore, any other message may be used as far as limitations can be imposed on the operation of a partner device acting as a providing device. That is, a session overlap notice may not necessarily be used. For example, a message for instructing termination of the automatic setting process or a message for instructing limitation or termination of the operation of the partner device as a providing device may be used.

In the foregoing description, furthermore, IEEE 802.11 compatible wireless LAN communication is used by way of example. However, the present invention may also be implemented using media compatible with other wireless standards such as Wireless Universal Serial Bus (Wireless USB), Multiband Orthogonal Frequency Division Multiplexing (OFDM) Alliance (MBOA), Bluetooth (registered trademark), Ultra Wide Band (UWB), and ZigBee. The present invention may also be implemented using wired communication media such as a wired LAN.

UWB includes wireless USB, wireless 1394, and WINET.

Furthermore, the communication parameters include a network identifier, an encryption method, an encryption key, an authentication method, and an authentication key, byway of example. Any other information may be used, or other information may be included in communication parameters.

The present invention may be implemented by providing a storage medium storing program code of software implementing the functions described above to a system or an apparatus and reading and executing the program code stored in the storage medium by using a computer (central processing unit (CPU) or microprocessing unit (MPU)) of the system or apparatus. In this case, the program code read from the storage medium implements the functions of the embodiments described above, and the storage medium storing this program code may constitute an embodiment of the present invention.

The storage medium for providing the program code may be implemented by, for example, a flexible disk, a hard disk, an optical disk, a magneto-optical disk, a compact disc read-only memory (CD-ROM), a compact disk recordable (CD-R), a magnetic tape, a non-volatile memory card, a ROM, a digital versatile disk (DVD), or the like.

Furthermore, in addition to the functions described above being implemented by executing the program code read by the computer, the functions described above may also be implemented by an operating system (OS) operating on the computer by performing some or all the actual processes in accordance with the instruction of the program code.

Furthermore, the program read from the storage medium may be written in a memory provided in a function expansion board placed in the computer or a function expansion unit connected to the computer. Then, the CPU provided in the function expansion board or function expansion unit may perform some or all the actual processes in accordance with the instruction of the program code to implement the functions described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device configured to perform a communication parameter setting process as a providing device configured to provide a communication parameter or a receiving device configured to receive the communication parameter provided by the providing device, the communication device comprising:
one or more processors; and
a memory having stored thereon instructions which, when executed by the one or more processors, cause the communication device to:
search for another communication device;
set a role of the communication device based on the following:
(i) in a case where the another communication device is searched for, a role of the communication device is set to the providing device or the receiving device using first information transmitted from the another communication device as a response signal to a predetermined request signal and second information stored in the communication device, and (ii) in a case where the communication device receives third information different from the first information and transmitted from a device operating as a providing device as a signal different from the response signal to the predetermined request signal, a role of the communication device is set to the receiving device without using the second information when the communication device performs the communication parameter setting process with the device operating as the providing device; and transmit the third information in a case where a role of the communication device is set to the providing device using the first information and the second information.

2. The communication device according to claim 1, wherein the instructions, when executed by the one or more processors, further cause the communication device to connect to a receiving device that receives the communication parameter using the communication parameter after the communication device provides the communication parameter as the providing device.

3. The communication device according to claim 1, wherein the communication device performs wireless communication with the another communication device based on the communication parameter.

4. The communication device according to claim 3, wherein the wireless communication is IEEE 802.11 compatible wireless LAN communication.

5. The communication device according to claim 1, wherein the communication parameter includes at least one of a network identifier, an encryption method, an encryption key, an authentication method and an authentication key.

6. The communication device according to claim 1, wherein the first information indicates a role of the another communication device.

7. The communication device according to claim 1, wherein the second information is a communication parameter set in the communication device.

8. A method of controlling a communication device configured to perform a communication parameter setting process as a providing device configured to provide a communication parameter or a receiving device configured to receive the communication parameter provided by the providing device, the method comprising:

searching for another communication device;

setting a role of the communication device based on the following:
(i) in a case where the another communication device is searched for, setting a role of the communication device to the providing device or the receiving device using first information transmitted from the another communication device as a response signal to a predetermined request signal and second information stored in the communication device, and
(ii) in a case where the communication device receives third information different from the first information and transmitted from a device operating as a providing device as a signal different from the response signal to the predetermined request signal, setting a role of the communication device to the receiving device without using the second information when the communication device performs the communication parameter setting process with the device operating as the providing device; and transmitting the third information in a case where the role of the communication device is set to the providing device using the first information and the second information.

9. A non-transitory computer-readable medium storing a program for causing a computer to function as a communication device configured to perform a communication parameter setting process as a providing device configured to provide a communication parameter or a receiving device configured to receive the communication parameter provided by the providing device, wherein the program, when executed by the computer, causes the computer to:

search for another communication device;

set a role of the communication device based on the following:
(i) in a case where the another communication device is searched for, a role of the communication device is set to the providing device or the receiving device using first information transmitted from the another communication device as a response signal to a predetermined request signal and second information stored in the communication device, and
(ii) in a case where the communication device receives third information different from the first information and transmitted from a device operating as a providing device as a signal different from the response signal to the predetermined request signal, a role of the communication device is set to the receiving device without using the second information when the communication device performs the communication parameter setting process with the device operating as the providing device; and transmit the third information in a case where a role of the communication device is set to the providing device using the first information and the second information.

* * * * *